United States Patent [19]

Rowe

[11] Patent Number: 5,260,953

[45] Date of Patent: Nov. 9, 1993

[54] TUNABLE SOLID-STATE LASER

[75] Inventor: T. Scott Rowe, Mission Viejo, Calif.

[73] Assignee: Alcon Surgical, Inc., Fort Worth, Tex.

[21] Appl. No.: 942,165

[22] Filed: Sep. 8, 1992

[51] Int. Cl.⁵ .............................................. H01S 3/10
[52] U.S. Cl. ..................................... 372/20; 372/105;
372/94; 372/41; 372/22; 372/21; 372/703
[58] Field of Search ................... 372/703, 105, 94, 41,
372/22, 21, 20, 92, 93, 98, 101

[56] References Cited

U.S. PATENT DOCUMENTS

| | | |
|---|---|---|
| 3,949,323 | 4/1976 | Bierlein et al. |
| 4,907,235 | 3/1990 | Kuizenga . |
| 5,047,668 | 9/1991 | Bosenberg . |
| 5,097,478 | 3/1992 | Verdiell et al. ........................ 372/21 |
| 5,117,126 | 5/1992 | Geiger . |
| 5,144,630 | 9/1992 | Lin . |

OTHER PUBLICATIONS

*Near Infrared Tunable Operation of Chromium Doped Forsterite Laser*, V. Petricevic, S. K. Gayen, S. K. Gayen, and R. R. Alfano, May 1, 1989, vol. 28, No. 9, pp. 1609–1611, Applied Optics.

*Continuous-Wave Laser Operation of Chromium-Doped Forsterite*, V. Petricevic, S. K. Gayen, and R. R. Alfano, Jun. 15, 1989, vol. 14, No. 12, pp. 612–614, Optics Letters.

*Chromium-Activated Forsterite Laser*, V. Petricevic, S. K. Gayen and R. R. Alfano, Reprint from the Proceedings of the OSA Topical Meeting on Tunable Solid State Lasers, May 1-3, 1989, North Falmouth, Cape Cod, Mass., pp. 77–84.

Excerpts from the proceedings of the International Conference of Lasers, Dec., 1987, *Room Temperature Vibronic Laser Action in $Cr^{3+}$:$Mg_2Sio$*, V. Petricevic, S. K. Gayen and R. R. Alfano, pp. 423–425.

*Primary Examiner*—Léon Scott, Jr.
*Attorney, Agent, or Firm*—Jeffrey S. Schira

[57] ABSTRACT

A solid-state tunable laser having a ND:YAG pumping source, a chromium-doped fosterite crystal lasing medium, a birefringent filter for selecting a specific fundamental wavelength, a pair of harmonic generating crystals mounted on counter-rotating platforms driven by stepper motors under the control of a computer, a partially reflective, partially transmissive mirror for directing the output of the pumping source through the lasing medium so that the lasing medium produces radiation having a range of fundamental wavelengths, and a fully reflective mirror for directing the radiation of the specific fundamental wavelength through the birefringent filter and the pair of crystals so as to produce radiation of a harmonic wavelength of the specific fundamental wavelength.

41 Claims, 6 Drawing Sheets

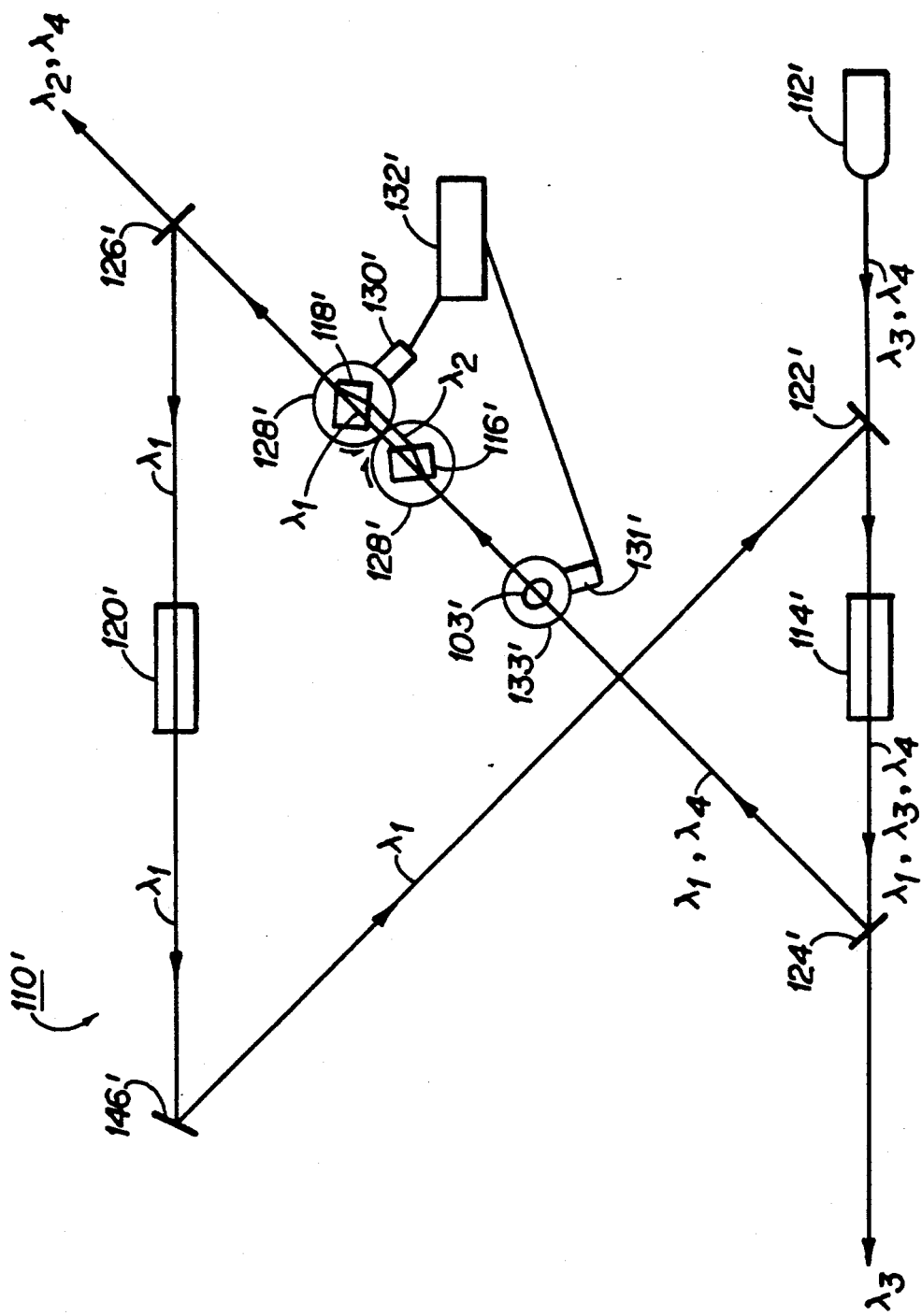

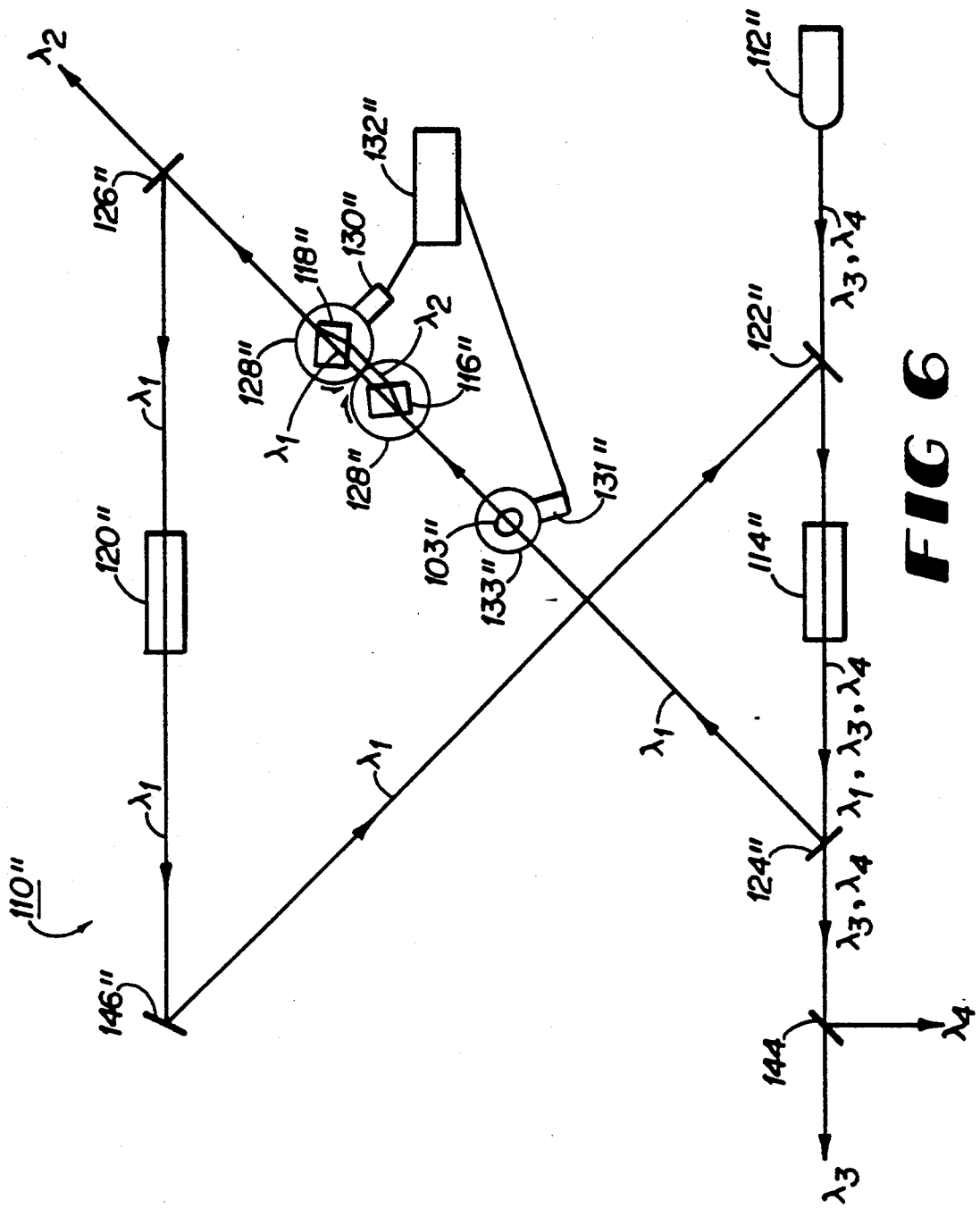

TUNABLE SOLID-STATE LASER

BACKGROUND OF THE INVENTION

The present invention relates in general to lasers and nonlinear optical equipment, and more particularly to laser equipment in which the energy circulating fundamental wavelength is tunable to differing output harmonic wavelengths.

Laser systems have been widely used in the medical field for the treatment of tissue. The high intensity energy of a laser beam can be concentrated into a small cross-sectional area and used to treat different types of tissues to accomplish different functions, such as cutting, cauterizing, cell destruction, etc. Each type of tissue generally reacts positively to radiation of a specific wavelength. Therefore, laser systems operating at various fundamental wavelengths are advantageous for different types of operations. For example, in ophthalmic surgical operations, it has been found that a YAG-type laser generating a wavelength of 1064 or 1320 nanometers (nm) is especially advantageous for cyclophotocoagulation or capsulotomies. Radiation wavelengths in the yellow range of the visible spectrum have been found to be advantageous in the treatment of retinal telangiectatic or intraretinal vascular abnormalities. Radiation wavelengths in the orange range of the visible spectrum have been found to be advantageous in the treatment of parafoveolar subretinal neovascularization in hypopigmented individuals. Radiation wavelengths in the red range of the visible spectrum have been found to be advantageous in the treatment of foveolar subretinal neovascularization, intraocular tumors such as choroidal malignant melanomas and retinoblastomas, as well as in the production of panretinal photocoagulation. Radiation wavelengths in the blue-green range of the visible spectrum have been found to be excellent photocoagulators.

As can be seen, different radiation wavelengths can be used to treat different physical diseases, and no single radiation band is suitable for the treatment of a wide variety of diseases. While most lasers are not monochromatic and produce radiation with a variety of wavelengths, the radiation spectrum of most lasers is relatively narrow with radiation output peaks occurring at fairly well-defined wavelength lines. However, many methods currently exist for generating additional wavelengths from existing lasers.

One technique for generating an output radiation beam having a different wavelength than that generated by the lasing medium is by the use of nonlinear frequency conversion crystals. Specialized harmonic crystals have been developed for use with currently available lasing mediums to provide an output wavelength different from the characteristic wavelength generated by the lasing medium itself. Disclosed in U.S. Pat. Nos. 3,949,323 and 4,826,283 are techniques for fabricating a harmonic crystal for use with lasing mediums where the crystal is responsive to an input fundamental wavelength to produce an output harmonic wavelength. The disclosure of these patent is incorporated herein by reference. Crystals adapted for generating harmonic wavelengths include the following types: Potassium dihydrogen phosphate (KDP or $KH_2PO_4$), Potassium dideuterium phosphate ($KD^*P$ or $KD_2PO_4$), Potassium titanyl phosphate (KTP or $KTiOPO_4$), Lithium triborate (LBO or $LiB_3O_5$), Beta-barium borate (BBO), KTA, lithium niobate doped with MgO ($MgO:LiNbo_3$), Lithium iodate ($LiIO_3$), RbTP, RbTA, YAB, $KNbO_3$, Urea, BANANA crystals, and others. A more complete discussion of nonlinear devices and crystals used in such devices can be found in W. Koechner, *Solid-State Laser Engineering* (2d ed. 1988), which is incorporated herein by reference.

Electromagnetic waves propagating in a crystal having nonlinear optical properties induce polarization waves with frequencies that are the sum and the difference of the frequencies of the exciting waves. These polarization waves can radiate electromagnetic waves having the frequencies of the polarization waves. The energy transferred to a radiated electromagnetic wave from a polarization wave depends on the magnitude of the component of the second order polarization tensor involved because this tensor element determines the amplitude of the polarization wave and also the distance over which the polarization wave and the radiated electromagnetic wave can remain sufficiently in phase, called the coherence length. The coherence length is give by $$\frac{\pi}{\Delta K}$$

wherein $\Delta K$ is the difference between the wave vector of the radiated electromagnetic wave and the wave vector of the polarization wave. Phase matching occurs when the waves are completely in phase, that is when $\Delta K = 0$. The condition $\Delta K = 0$ can also be expressed as $n_3 w_3 = N_1 w_1 \pm n_2 w_2$ wherein $w_3 = w_1 \pm w_2$ and where $w_1$ and $w_2$ are the frequencies of the incident light and $w_3$ is that of the radiated optical wave and the n's are the corresponding refractive indices. The plus signs are appropriate when the sum frequency is the one of interest; the minus signs are appropriate when the difference frequency is the one of interest. A particular case that will be used as a simple example of nonlinear effects in second harmonic generation (SHG) where there is only one incident wave of frequency w and $w_1 = w_2 = w$ and $w_3 = 2w$.

The above phase matching conditions can be met with birefringent crystals provided the refractive index difference between the ordinary and the extraordinary rays is sufficiently large to offset the change of refractive index with frequency, i.e., optical dispersion.

A complication in this phase matching process is the fact that phase matching occurs only for certain crystallographic directions. If a light ray deviates from this phase-matched direction, a mismatch occurs and $\Delta K$ is no longer zero. For example, when collinear phase-matched SHG is used such a situation occurs if the alignment of the incoming beam and the phase-matched crystallographic direction is not exact or if the incoming beam is slightly divergent. In general, $\Delta K$ will be a linear function of the deviation $\Delta e$ from the phase-matched direction. This places a restriction on the allowable angular divergence since a useful coherence length must be maintained. In addition, because of the double refraction, the radiated electromagnetic wave and the polarization wave will in general propagate in different directions, termed "walk-off", thereby reducing the interaction distance. Phase matching under these unfavorable conditions is called "critical phase matching" (CPM). For certain crystallographic directions, $\Delta K$ does not vary linearly with the angular deviation $\Delta e$, but rather varies as $(\Delta e)^2$. As a result, greater divergence from the phase-matched direction is allowable and no first-order "walk-off" occurs. Phase matching under these conditions is called "non-critical phase matching" (NCPM). The advantages of NCPM over CPM for practical devices are obvious. The indices of refraction can be adjusted by temperature variation or compositional variation in suitable cases so that phase matching occurs for crystallographic directions along which NCPM is possible. For biaxial crystals such as lithium triborate ($LiB_3O_5$ or "LBO" crystals), NCPM conditions are possible for the SHG only when propagation is along certain of the principal axes of the optical indicatrix. See M. V. Hobden, J. Appl. Phys. 38, 4365 (1967).

The possibility of achieving one or more types of phase matching, and the appropriate orientation of the crystal to the incident wave depends on the existence of non-zero elements in the second order polarization tensor. Depending on the point group symmetry of the crystal, some elements will be identically zero and equalities are imposed on other elements. The magnitude of the effects will depend on the magnitude of the non-zero elements.

One laser capable of emitting radiation having a relative wide spectrum or bandwidth without the use of a harmonic crystal is the tunable dye laser. The dye laser is capable of producing moderately powered radiation emissions at any wavelength from 360 to 960 nm, depending upon the organic dye used and the lasing medium. Laser action is produced by the interaction of a pump argon laser beam with a jet of organic dye, producing laser resonance and a radiation output having a relatively broad bandwidth. A birefringent filter is used to select the desired wavelength. While dye lasers are capable of producing output radiation in the yellow, orange and red portions of the visible spectrum, dye lasers are relatively expensive and complex, increasing operating and maintenance costs.

Several other lasing mediums have proved to be inherently tunable. Such lasers include Chromium, Alexandrite, Emerald, Vanadium, Titanium, Scandium Borate, Chromium-doped Fosterite (Cr: $Mg_2SiO_4$), Cobalt-Magnesium Fluoride (Co:$MgF_2$), Cr:GdScGa-Garnet and Rare Earth lasers. While in most lasers, all of the energy released via stimulated emissions by the excited medium is in the form of photons, in these lasing mediums, the stimulated emissions of photons is coexistent with the emission of vibrational quanta (phonons) in a crystal lattice. Although the total energy of the lasing transition is fixed, the energy can be separated between photons and phonons in a continuous manner, resulting in broad wavelength tunability of the laser output. Specific wavelengths can be isolated using an etalon or a birefringent filter. However, the radiation wavelength of these lasers generally is greater than 700 nm, within the infrared spectrum and outside of the wavelength range that has been found most useful in medical applications.

Accordingly, a need continues to exist for a solid-state laser capable of being tuned so as to emit radiation of varying wavelengths within the visible spectrum.

BRIEF SUMMARY OF THE INVENTION

The present invention improves upon prior art lasers by providing a laser capable of being tuned continuously between the radiation output wavelengths of 580 nm to 673 nm (yellow to red), as well as producing radiation having a wavelength of approximately 532 nm (green), having a laser cavity with a chromium-doped fosterite (Cr:$Mg_2SiO_4$) lasing medium pumped by a continuous wave (CW) or pulsed Nd:Yag laser, a birefringent filter and a pair of harmonic generating (frequency doubling) crystals mounted on counter-rotating platforms or meshed gears. By directing the radiation output of the fosterite laser rod through the birefringent filter, radiation of a specific fundamental wavelength can be directed through the crystal pair, and the 1167 nm to 1345 nm wavelength band of the fosterite rod can be halved to a wavelength band of approximately between 583 nm and 673 nm. An optical isolator reduces the back reflections within the laser cavity, increasing the performance and lifetime of the laser. In addition, the output of the ND:YAG pumping laser may also be frequency doubled so that the laser also produces radiation having wavelengths of 1064 nm or 532 nm.

Accordingly, one objective of the present invention is to provide a tunable, solid-state laser.

Another objective of the present invention is to provide a solid-state laser capable of emitting radiation of a wavelength approximately between 580 and 680 nm.

Still another objective of the present invention is to provide a solid-state laser using a pair of harmonic generating crystals to tune the radiation emitted from the laser over a relatively broad wavelength range.

These and other objective and advantages of the laser of the present invention will become apparent from the detailed description, drawings and claims that follow.

BRIEF DESCRIPTION OF THE DRAWINGS

FIG. 5 is a schematic illustration of a fifth embodiment of the laser of the present invention.

FIG. 6 is a schematic illustration of a sixth embodiment of the laser of the present invention.

DETAILED DESCRIPTION OF THE INVENTION

Figure 1:
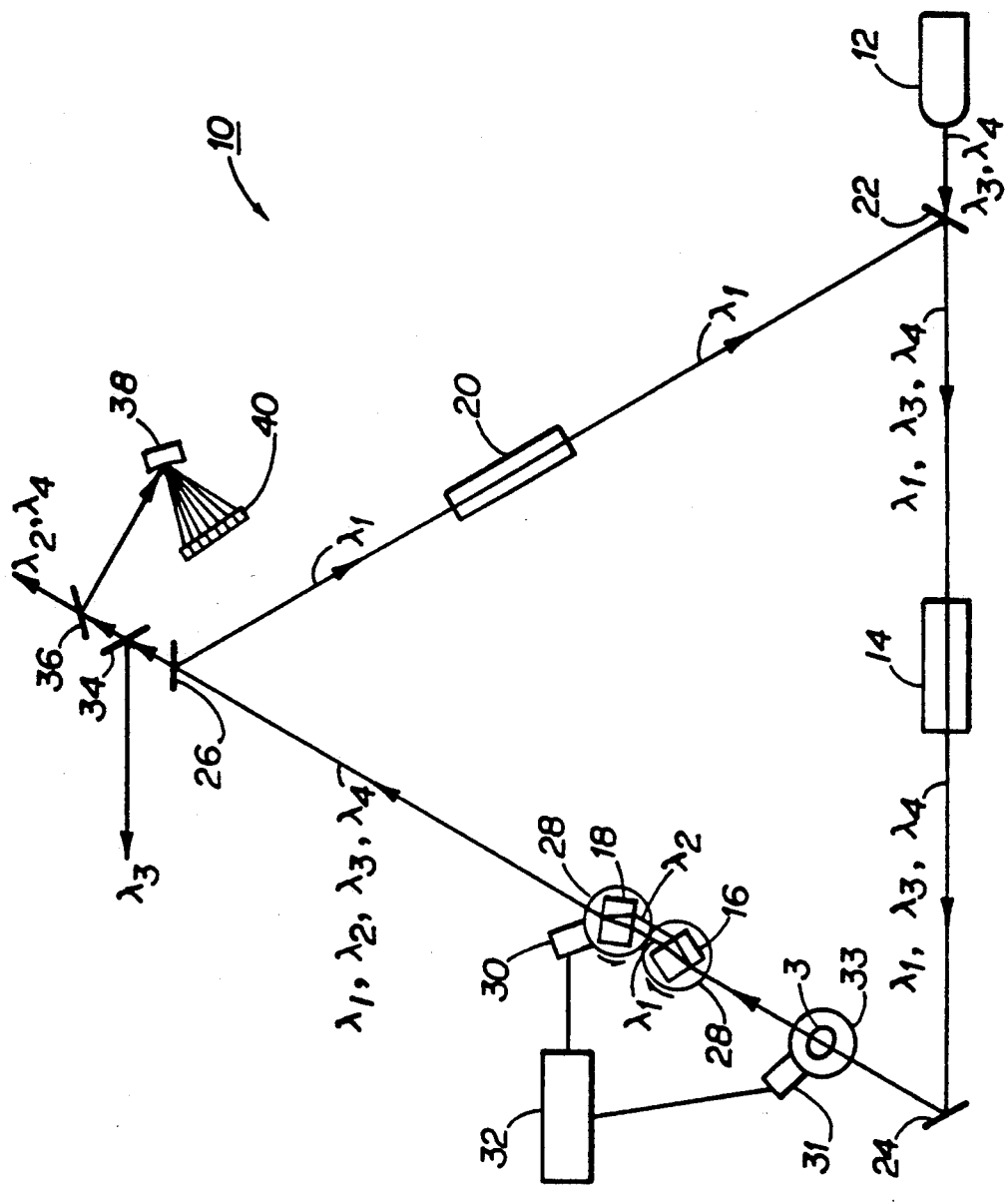
FIG. 1 is a schematic illustration of a first embodiment of the laser of the present invention.

As can be seen in FIG. 1, laser 10 of the present invention generally consists of birefringent filter 3, pumping source 12, lasing medium 14, harmonic generating crystals 16 and 18, optical isolator 20, mirrors 22, 24, 26, 34 and 36, platform 33, holographic grating 38, CCD array 40, counter-rotating platforms or gears 28, stepper motors 30 and 31 and computer 32. Pumping source 12 can be any suitable laser but a continuous wave or pulsed Nd:Yag emitting radiation having a wavelength of 1064 nm is preferred. Alternatively, the frequency of the radiation emitted from pumping source 12 can be doubled, so that the wavelength emitted is 532 nm, by using a frequency doubling crystal in a manner that is well-known in the art. Lasing medium 14 can be any suitable laser crystal such as Chromium, Alexandrite, Emerald, Vanadium, Titanium, Scandium Borate, Chromium-doped Fosterite (Cr:$Mg_2SiO_4$), Cobalt-Magnesium Fluoride (Co:$MgF_2$) or Cr:GdScGa-Garnet but chromium-doped fosterite (Cr:$Mg_2SiO_4$) is preferred because this crystal will produce frequency doubled wavelengths of between approximately 583 nm and 673 nm and because chromium-doped fosterite can be pumped by both the 1064 nm fundamental wavelength of a ND:YAG pumping source and the 532 nm first harmonic of the ND:YAG pumping source. Crystals 16 and 18 can be any suitable harmonic generating or frequency doubling crystal such as Potassium dihydrogen phosphate (KDP or $KH_2PO_4$), Potassium dideuterium phosphate (KD*P or $KD_2PO_4$), Potassium titanyl phosphate (KTP or $KTiOPO_4$), Lithium triborate (LBO or $LiB_3O_5$), Beta-barium borate (BBO), KTA, lithium niobate doped with MgO ($MgO:LiNbo_3$), Lithium iodate ($LiIO_3$), RbTP, RbTA, YAB, $KNbO_3$, Urea or BANANA crystals but BBO or LBO crystals are preferred. Filter 3 is used to tune the fundamental wavelength of lasing medium 14 within the fundamental wavelength range of 1167 nm to 1345 nm of the fosterite crystal to allow only a specific wavelength to resonate at any given time. Filter 3 preferably is a quartz crystal and is tuned by mounting filter 3 on rotating platform 33 that is rotated by motor 31 under the command of computer 32. Suitable filters 3 are available from sources such as Spectra Physics Corporation, Mountain View, Calif. Optical isolator 20 may be any suitable optical device for ensuring that laser 10 oscillates in one direction only, such as a Faraday rotator. Suitable isolators 20 are commercially available from sources such as Isowave, Dover, N.J. 07801. Mirrors 22 and 26 preferably are highly reflective of the fundamental wavelengths ($\lambda_1$) emitted by lasing medium 14 but transmissive of the harmonic wavelengths ($\lambda_2$) emitted by crystals 16 and 18 and the pumping wavelengths ($\lambda_3$ and $\lambda_4$) emitted by pumping source 12. Mirror 24 preferably is highly reflective of all wavelengths ($\lambda_1, \lambda_2, \lambda_3$ and $\lambda_4$). Mirrors 24 and 26 may be either curved or flat. Suitable mirrors 22, 24 and 26 are commercially available from sources such as CVI Laser Corporation. Platforms or gears 28 and 33 may be any suitable device and are commercially available from sources such as W. M. Berg Corporation. Stepper motors 30 and 31 may be any suitable motor such as those available from Rapid Syn Corporation. Computer 32 may be any suitable microcomputer having at least an INTEL ®80286 microprocessor or equivalent.

In use, pumping source 12 is energized and the radiation output ($\lambda_3$ or $\lambda_4$) of source 12 is directed through mirror 22 and pumps lasing medium 14, stimulating lasing medium 14 to emit radiation in a range of fundamental wavelengths $\lambda_1$. The radiation output of lasing medium 14 is 25, directed by mirror 24 through filter 3. Filter 3 is rotated by stepper motor 31 to select one fundamental wavelength $\lambda_1$ out of the range of wavelengths being emitted by medium 14 for optical amplification. Filter 3 directs the selected wavelength $\lambda_1$ through crystal 16, thereby generating harmonic wavelength $\lambda_2$. The wavelength of $\lambda_2$ will depend upon the angular orientation of crystal 16 relative the path of the fundamental wavelength $\lambda_1$. However, crystal 16 will refract or alter the path of both the fundamental wavelength $\lambda_1$ and the harmonic wavelength $\lambda_2$ (walk-off). This deviation is especially critical when a ring or bowtie cavity is used. Therefore, crystal 18, which is identical to crystal 16, is used to realign the path of the radiation along the proper optical path and against mirror 26. In addition, crystals 16 and 18 act as a polarizer, working with filter 3 to allow only one laser line emitted from lasing medium 14 to oscillate at a time. Crystal 18 also acts as a frequency doubling crystal for any remaining energy at wavelength $\lambda_1$ not converted to wavelength $\lambda_2$ by crystal 16. Mirror 26, being transmissive of all wavelengths other than $\lambda_1$, reflects radiation of wavelength $\lambda_1$ toward mirror 22, initiating a continuous cycle through laser 10 for all radiation of wavelength $\lambda_1$, but allows all other wavelengths to exit laser 10. Isolator 20 maintains oscillation in a clockwise direction only. However, if laser 10 has a linear cavity, isolator 20 is not needed. Radiation passing through mirror 26 may be directed to mirror 34 that is transmissive of radiation wavelengths $\lambda_2$ and $\lambda_4$ but reflective of 13 (1064 nm) and thereby allows radiation of the fundamental wavelength emitted by pumping source 12 to be isolated, if so desired. Radiation of wavelengths $\lambda_2$ and $\lambda_4$ passing through mirror 34 is directed to mirror 36 that allows most of the radiation to pass through to enter any suitable delivery system, such as a fiber optic cable (not shown), but directs a small portion of the radiation to holographic grating 38 that disperses and reflects the radiation onto CCD array 40. Each cell of array 40 will be illuminated by a unique color of light. Thus, array 40 acts as a wavelength detector for detecting the particular wavelength ($\lambda_2$ or $\lambda_4$) emitted by laser 10. However, the use of mirror 36, grating 38 and array 40 is not required. For example, because there are specific phase match and birefringent tuning angles unique to each fundamental (and thus second harmonic) wavelength, computer 32 may command motors 30 and 31 to rotate crystals 16 and 18 and filter 3, respectively, to a specific orientation that will allow only a specific fundamental wavelength $\lambda_1$ to resonate, thereby producing a specific harmonic $\lambda_2$. By way of example, for a fundamental wavelength $\lambda_1 = 1.167$ μm, the tuning angle $\Theta_B$ of filter 3 is 68.75°. To generate second harmonic $\lambda_2 = 0.5835$ μm, the phase match angle $\Theta_M$ of crystals 16 and 18 is 21.5°. For a fundamental wavelength $\lambda_1 = 1.345$ μm, the tuning angle $\Theta_B$ of filter 3 is 90°. To generate second harmonic $\lambda_2 = 0.6725$ μm, the phase match angle $\Theta_M$ of crystals 16 and 18 is 20.2°.

Crystals 16 and 18 are mounted on counter-rotating platforms or gears 28 connected to stepper motor 30 under the control of computer 32, enabling the user to tune crystals 16 and 18 to produce different harmonic wavelengths $\lambda_2$. As previously stated, the harmonic wavelength generated by crystal 16 depends upon the angular orientation of crystals 16 and 18 within the laser cavity. By altering the angle of crystals 16 and 18, wavelength $\lambda_2$ will vary. However, the amount of walk-off will also vary. Therefore, for any angular change made to crystal 16, crystal 18 must be rotated an equal amount in the opposite direction in order to correct any deviation from the proper optical path. By mounting crystals 16 and 18 on meshing gears 28, crystals 16 and 18 will always be counter-rotated an equal amount. In addition to determining the wavelength of radiation emitted by laser 10 by the use of mirror 36, grating 38 and array 40, the wavelength of the radiation emitted from laser 10 depends on the angular orientation of crystals 16 and 18. Accordingly, the angular position of crystals 16 and 18, as detected by computer 32, will correspond with only one specific wavelength. Therefore, the wavelength of the radiation emitted by laser 10 will be known for any particular angular orientation of crystals 16 and 18 and the use of grating 38 and array 40 as a wavelength detector is not absolutely necessary.

Figure 2:
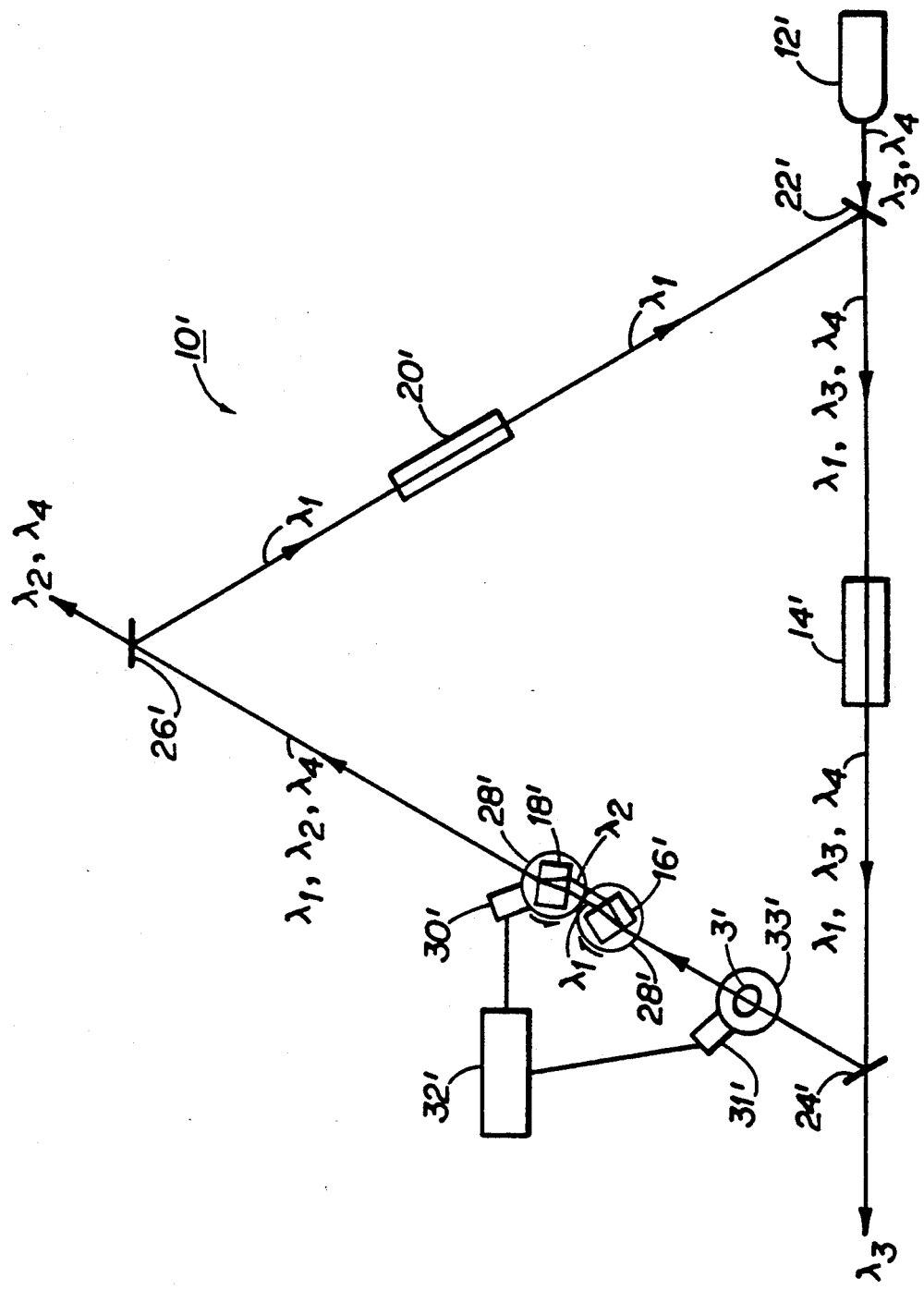
FIG. 2 is a schematic illustration of a second embodiment of the laser of the present invention.

A second embodiment of laser 10' of the present invention, illustrated schematically in FIG. 2, is similar to the first embodiment illustrated in FIG. 1 except this embodiment illustrates laser 10 without mirrors 34 and 36, grating 38 and array 40. In this embodiment, radiation of wavelength $\lambda_3$, the fundamental wavelength of pumping source 12, exits laser 10 at mirror 24' and enters a suitable delivery source (not shown). To accomplish this, mirror 24' is reflective of radiation wavelength $\lambda_1$, $\lambda_2$ and $\lambda_4$ but transmissive of radiation wavelength $\lambda_3$.

Figure 3:
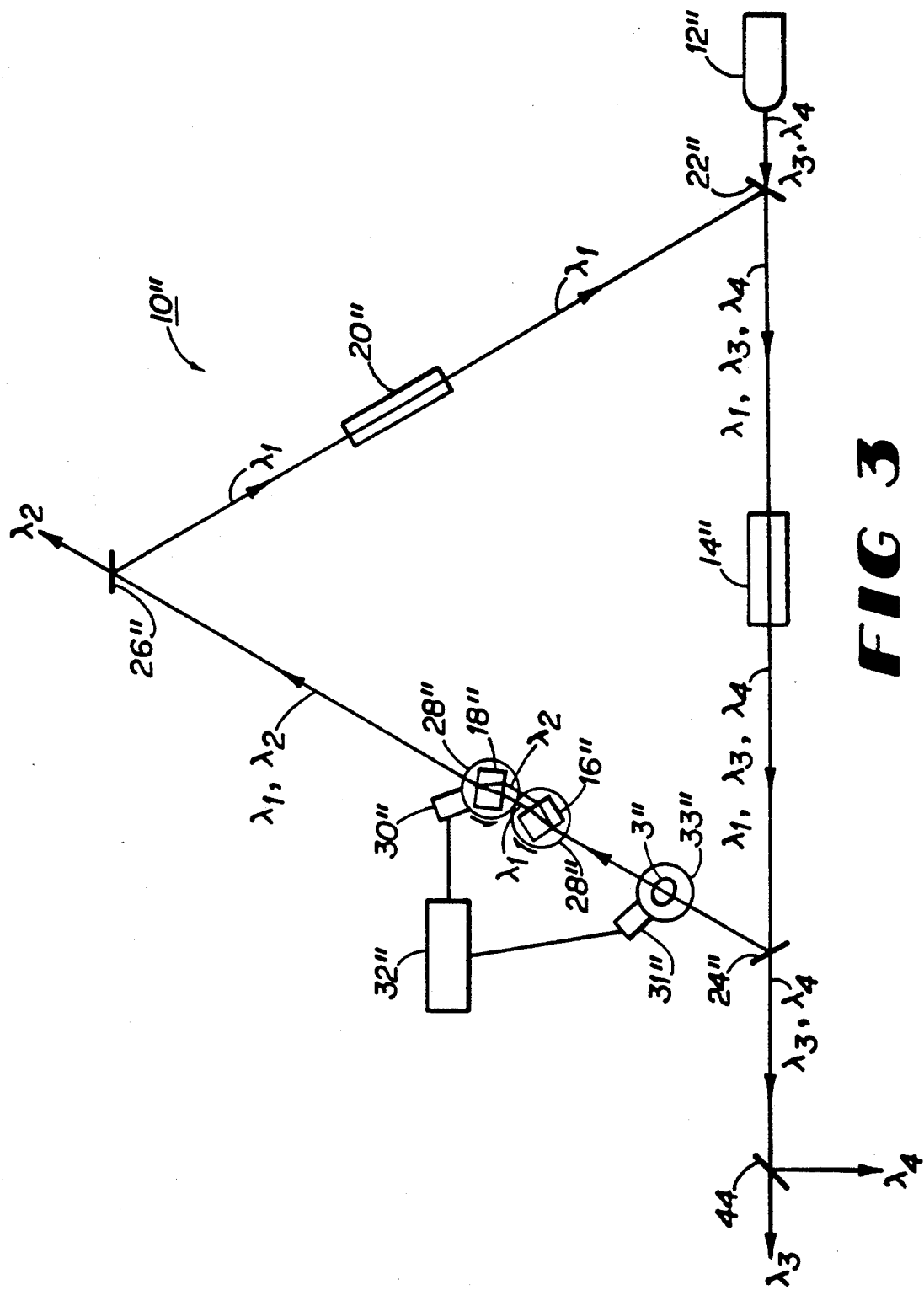
FIG. 3 is a schematic illustration of a third embodiment of the laser of the present invention.

A third embodiment of laser 10" of the present invention, illustrated schematically in FIG. 3, is similar to the first and second embodiments illustrated in FIGS. 1 and 2 except mirror 24" is transmissive of both the fundamental $\lambda_3$ and harmonic $\lambda_4$ wavelengths emitted by pumping source 12". Wavelengths $\lambda_3$ and $\lambda_4$ are separated outside of laser 10" by mirror 44.

Figure 4:
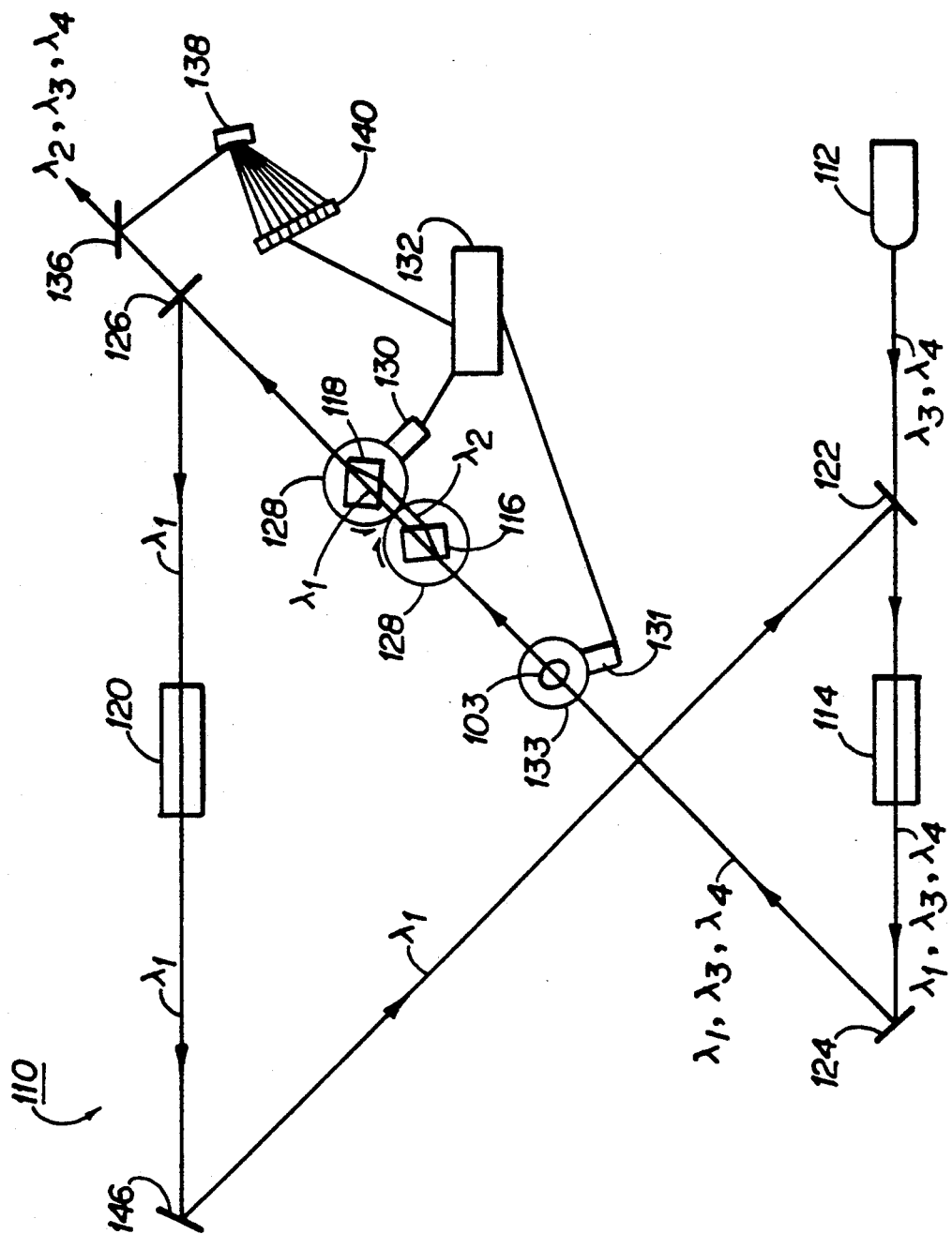
FIG. 4 is a schematic illustration of a fourth embodiment of the laser of the present invention.

FIG. 4 illustrates another embodiment of laser 110 of the present invention using a "bow-tie" laser cavity. Radiation of either fundamental wavelength $\lambda_3$ or harmonic wavelength $\lambda_4$ is emitted from pumping source 112 and passes through mirror 122 where it pumps lasing medium 114 causing lasing medium 114 to emit radiation of fundamental wavelength $\lambda_1$. Radiation wavelength $\lambda_1$, $\lambda_3$ and $\lambda_4$ are reflected by mirror 124 through crystal pair 116 and 118, which are mounted on counter-rotating platforms 128 driven by motor 130 under the direction of computer 132. Crystal pairs 116 and 118 convert most of the radiation of fundamental wavelength $\lambda_1$ into harmonic wavelength $\lambda_2$. Radiation wavelength $\lambda_2$, $\lambda_3$ and $\lambda_4$ pass through mirror 126 by any residual radiation of wavelength $\lambda_1$ not coverted by crystal pair 116 and 118 is reflected by mirror 126 through isolator 120, off mirrors 146 and 122 and through lasing medium 114, initiating another pass through the crystal pair 116 and 118. Laser 110 illustrated in FIG. 4 also uses mirror 136, grating 138 and array 140 in the manner described above for detecting the wavelength of the radiation emitted by laser 110.

FIG. 5 illustrates another embodiment of laser 110' of the present invention similar to the embodiment illustrated in FIG. 4 except mirror 124' is transmissive of radiation having a wavelength $\lambda_3$ (the fundamental wavelength of pumping source 112'), allowing this radiation wavelength to be isolated and connected to a suitable optical connector (not shown).

FIG. 6 illustrates still another embodiment of laser 110" of the present invention similar to the embodiment illustrated in FIG. 5 except mirror 124" is transmissive of radiation having wavelengths $\lambda_3$ and $\lambda_4$ (the fundamental and harmonic wavelengths of pumping source 112"), allowing these radiation wavelengths to be isolated, separated by mirror 144 and connected to a suitable optical connector (not shown). This description is given for purposes of illustration and explanation. It will be apparent to those skilled in the relevant art that various laser cavity configurations can be used and other changes and modifications can be made to the invention as described above without departing from its scope or spirit.

I claim:

1. A tunable solid-state laser, comprising:
   a) a pumping source producing a first radiation beam;
   b) a lasing medium pumped by the first radiation beam and producing a second radiation beam having a wavelength within a range of fundamental wavelengths;
   c) a birefringent filter;
   d) a means for tuning the birefringent filter to select a specific fundamental wavelength from the range of fundamental wavelengths produced by the lasing medium;
   e) a pair of counter-rotating harmonic generating crystals;
   f) a means for directing the second radiation beam through the birefringent filter and the pair of counter-rotating harmonic generating crystals; and
   g) a means for counter-rotating the crystals so as to produce radiation having a wavelength that is a desired harmonic of the specific fundamental wavelength.

2. The laser of claim 1 wherein the pumping source comprises a ND:YAG laser.

3. The laser of claim 1 wherein the lasing medium comprises a chromium-doped fosterite crystal.

4. The laser of claim 1 wherein the means for directing the second radiation beam through the birefringent filter and the pair of counter-rotating harmonic generating crystals comprises a mirror.

5. The laser of claim 1 wherein the pair of crystals comprise lithium triborate.

6. The laser of claim 1 wherein the pair of crystals comprise beta-barium borate.

7. The laser of claim 1 wherein the means for tuning the birefringent crystal comprises a first stepper motor under the control of a computer driving a rotating platform on which the birefringent filter is mounted.

8. The laser of claim 1 further comprising an optical isolator.

9. The laser of claim 1 wherein the crystals are mounted on counter-rotating platforms and the means for counter-rotating the crystals comprises a second stepper motor under the control of a computer driving the platforms.

10. The laser of claim 1 wherein the desired harmonic of the fundamental wavelength is between approximately 580 nanometers and 673 nanometers.

11. The laser of claim 1 wherein the range of fundamental wavelengths is approximately 1167 nanometers to 1345 nanometers.

12. A tunable solid-state laser, comprising:
   a) a ND:YAG pumping source producing a first radiation beam;
   b) a chromium-doped fosterite crystal lasing medium pumped by the first radiation beam and producing a second radiation beam having a wavelength within a range of fundamental wavelengths;
   c) a birefringent filter;
   d) a first stepper motor under control of a computer driving a rotating platform on which the birefringent filter is mounted for tuning the birefringent filter so as to select a specific fundamental wavelength from the range of fundamental wavelengths produced by the lasing medium;
   e) a pair of lithium triborate crystals mounted on counter-rotating platforms;
   f) a mirror directing the second radiation beam through the birefringent filter and the pair of lithium triborate crystals; and
   g) a second stepper motor under control of the computer for counter-rotating the crystals a predetermined amount so as to produce radiation having a wavelength that is a desired harmonic of the specific fundamental wavelength.

13. The laser of claim 12 further comprising an optical isolator.

14. The laser of claim 12 wherein the desired harmonic of the specific fundamental wavelength is between approximately 580 nanometers and 673 nanometers.

15. The laser of claim 12 wherein the range of fundamental wavelengths is approximately 1167 nanometers to 1345 nanometers.

16. A tunable solid-state laser, comprising:
   a) a ND:YAG pumping source producing a first radiation beam;
   b) a chromium-doped fosterite crystal lasing medium pumped by the first radiation beam and producing a second radiation beam having a wavelength within a range of fundamental wavelengths;
   c) a birefringent filter
   d) a first stepper motor under control of a computer driving a rotating platform on which the birefringent filter is mounted for tuning the birefringent filter so as to select a specific fundamental wavelength from the range of fundamental wavelengths produced by the lasing medium;
   e) a pair of beta-barium borate crystals mounted on counter-rotating platforms;
   f) a mirror directing the second radiation beam through the birefringent filter and the pair of beta-barium borate crystals; and
   g) a second stepper motor under control of the computer for counter-rotating the crystals a predetermined amount so as to produce radiation having a wavelength that is a desired harmonic of the specific fundamental wavelength.

17. The laser of claim 16 further comprising an optical isolator.

18. The laser of claim 16 wherein the desired harmonic of the specific fundamental wavelength is between approximately 580 nanometers and 673 nanometers.

19. The laser of claim 16 wherein the range of fundamental wavelengths is approximately 1167 nanometers to 1345 nanometers.

20. A method of producing laser radiation of a desired harmonic wavelength from a specific fundamental wavelength, comprising the steps of:
   a) producing a pumping beam of radiation from a pumping source;
   b) passing the pumping beam through a lasing medium to produce an output radiation beam having a range of fundamental wavelengths;
   c) passing the output radiation beam through a birefringent filter and tuning the birefringent filter to produce radiation of the specific fundamental wavelength;
   d) passing the radiation of the specific fundamental wavelength through a pair of harmonic generating crystals; and
   e) variably counter-rotating the crystals a predetermined amount so as to produce radiation having a wavelength that is the desired harmonic of the specific fundamental Wavelength.

21. The method claim 20 wherein the pumping source comprises a ND:YAG laser.

22. The method claim 20 wherein the lasing medium comprises a chromium-doped fosterite crystal.

23. The method claim 20 wherein the pair of crystals comprise lithium triborate.

24. The method claim 20 wherein the pair of crystals comprise beta-barium borate.

25. The method claim 20 further comprising the step of passing the radiation beam having a range of fundamental wavelengths through an optical isolator.

26. The method of claim 20 wherein the birefringent filter is mounted on a rotating platform and a means for tuning the birefringent filter comprises a first stepper motor under the control of a computer driving the platform.

27. The method of claim 20 wherein the crystals are mounted on counter-rotating platforms and a means for counter-rotating the crystals comprises a second stepper motor under the control of a computer driving the platforms.

28. The method of claim 20 wherein the desired harmonic of the fundamental wavelength is between approximately 580 nanometers and 673 nanometers.

29. The method claim 20 wherein the range of fundamental wavelengths is approximately 1167 nanometers to 1345 nanometers.

30. A method of producing laser radiation of a desired harmonic wavelength from a specific fundamental wavelength, comprising the steps of:
   a) producing a pumping beam of radiation from a ND:YAG laser pumping source;
   b) passing the pumping beam through a chromium-doped fosterite crystal to produce an output radiation beam having a range of fundamental wavelengths;
   c) passing the output radiation beam through a birefringent filter and tuning the birefringent filter to produce radiation of the specific fundamental wavelength;
   c) passing the radiation of the specific fundamental wavelength through a pair of lithium triborate crystals; and
   d) variably counter-rotating the crystals a predetermined amount so as to produce radiation having a wavelength that is the desired harmonic of the specific fundamental wavelength.

31. The method of claim 30 further comprising the step of passing the radiation beam having a range of fundamental wavelengths through an optical isolator.

32. The method of claim 30 wherein the birefringent filter is mounted on a rotating platform and a means for tuning the birefringent filter comprises a first stepper motor under the control of a computer driving the platform.

33. The method of claim 30 wherein the crystals are mounted on counter-rotating platforms and a means for counter-rotating the crystals comprises a second stepper motor under the control of a computer driving the platforms.

34. The method of claim 30 wherein the desired harmonic of the fundamental wavelength is between approximately 580 nanometers and 673.

35. The method of claim 30 wherein the range of fundamental wavelengths is approximately 1167 nanometers to 1345 nanometers.

36. A method of producing laser radiation of a desired harmonic wavelength from a specific fundamental wavelength, comprising the steps of:
   a) producing a pumping beam of radiation from a ND:YAG laser pumping source;
   b) passing the pumping beam through a chromium-doped fosterite crystal to produce an output radiation beam having a range of fundamental wavelengths;
   c) passing the output radiation beam through a birefringent filter and tuning the birefringent filter to produce radiation of the specific fundamental wavelength;

c) passing the radiation of the specific fundamental wavelength through a pair of beta-barium borate crystals; and d) variably counter-rotating the crystals a predetermined amount so as to produce radiation having a wavelength that is the desired harmonic of the specific fundamental wavelength.

37. The method of claim 36 further comprising the step of passing the radiation beam having a range of fundamental wavelengths through an optical isolator.

38. The method of claim 36 wherein the birefringent filter is mounted on a rotating platform and a means for tuning the birefringent filter comprises a first stepper motor under the control of a computer driving the platform.

39. The method of claim 36 wherein the crystals are mounted on counter-rotating platforms and a means for counter-rotating the crystals comprises a second stepper motor under the control of a computer driving the platforms.

40. The method of claim 36 wherein the desired harmonic of the e fundamental wavelength is between approximately 580 nanometers and 673 nanometers.

41. The method of claim 36 wherein the range of fundamental wavelengths is approximately 1167 nanometers to 1345 nanometers.

* * * * *